United States Patent

[11] 3,570,352

| [72] | Inventor | Shichiro Morita |
| | | Sasebo, Japan |
| [21] | Appl. No. | 769,832 |
| [22] | Filed | Oct. 23, 1968 |
| [45] | Patented | Mar. 16, 1971 |
| [73] | Assignee | Sasebo Heavy Industries Co., Ltd. |
| | | Tokyo, Japan |
| [32] | Priority | Apr. 1, 1968 |
| [33] | | Japan |
| [31] | | No 43-21034 |

[54] APPARATUS FOR AUTOMATICALLY CUTTING AND REMOVING COIL BAND
3 Claims, 7 Drawing Figs.

[52] U.S. Cl. .................................................. 83/467,
83/482, 83/488, 83/564
[51] Int. Cl. ................................................. B23d 45/02
[50] Field of Search .......................................... 83/483-
—489, 564, 482, 490, 470, 441, 438, 446, 467;
143/47

[56] References Cited
UNITED STATES PATENTS

| 1,797,646 | 3/1931 | Gardner ...................... | 143/47X |
| 3,072,004 | 1/1963 | Jenkins ........................ | 83/488X |

FOREIGN PATENTS

| 951,561 | 3/1964 | Great Britain ................ | 83/490 |

Primary Examiner—James M. Meister
Attorney—George B. Oujevolk

ABSTRACT: A saw cutter which cuts a coil band. The coil stops at a predetermined position. Here the coil is cut by a saw. The cut piece is placed on a belt and guided by a magnet. It travels along the belt to a pulley where it is bent into a circular shape. It is received by a receiving base operated by a cylinder and thereafter dropped for treatment.

Patented March 16, 1971

INVENTOR.
Shichiro Morita

BY George B. Oujvock
Attorney

APPARATUS FOR AUTOMATICALLY CUTTING AND REMOVING COIL BAND

This invention relates to an apparatus for automatically cutting and removing coil band. A metal strip produced in a long successive band shape is wound up in a coil shape and the outside of said strip coil is bundled by a band for the purpose of transportation. Accordingly, to apply said strip coil to the subsequent process line it is necessary to cut off the band for bundling said strip coil to remove it in advance.

Heretofore the operation of cutting and removing the aforementioned bundling band has been carried out manually by operator. The present invention has for its object to provide an apparatus for automating said operation and economizing the number of operators thereby to improve the efficiency of the operation.

Simply speaking, the apparatus according to the present invention comprises a saw cutter which cuts said coil band, and an apparatus for holding said cut band by a magnet to remove it. More particularly, in the apparatus according to the present invention, when a coil 1 transported from the direction shown by arrow in FIG. 2 stops at a predetermined position, a saw 19 of the saw cutter commences its rotation by the stop signal and is pressed close to the coil surface, then the saw cutter slides to cut off the band 2. The cut band is placed on a belt 48 and transported while being held by a magnet 59 shown in FIG. 7, and when it reaches a pulley 42, it is bent in a small circle from the outside by a belt 52 and further received by a circular band receiving base 57 operated by a cylinder 54 and thereafter dropped for treatment.

The first feature of the apparatus according to the present invention resides in that saw cutters whose number is corresponding to the number of coil band, for example, three are arranged on a common metal base plate with their blades disposed in parallel, further said base plate is so constructed as to slide in a direction parallel with saw blades by an oil pressure cylinder on a beam on which said plate is placed, whereby all coil bands can be cut simultaneously by sliding said base plat while rotating said saw blades.

The second feature of the apparatus according to the present invention resides in that the beam having the metal base plate on which saw cutters slide can be oscillated by the oil pressure cylinder or the like at the center of a pin provided in parallel with the direction of reciprocating motion of the aforementioned metal base plate, whereby constantly precise cutting efficiency suitable for diameters of various kinds of strip coils can be displayed.

The third feature of the apparatus according to the present invention resides in a mechanism for supporting saw cutter. The saw cutter is not stationarily mounted on said metal base plate but stationarily supported on the base of saw cutter, said saw cutter base being supported in a freely oscillating manner on said metal base plate under the pressure of a spring by a pin 14 provided protuberantly in parallel with the direction of reciprocating motion of said metal base plate, whereby the beam which mounts said metal base plate in a freely slidable manner is oscillated, and when saw blades and receiving metal fittings for regulating stroke present in the vicinity thereof are pressed against the coil band, they are pressed through the compression of said spring, and hence saw blades are rotated while being compressed under suitable pressures, thus no trouble being caused on the saw blades and best sharpness thereof being displayed.

The fourth feature of the apparatus of the present invention resides in that the apparatus is provided with a device for preventing the transverse motion of the band which presses the coil band during the cutting operation so that the band does not slide by the frictional force of the saw blade. Said apparatus for preventing the transverse motions of the band comprises a stopper in which a suitable number of pins are planted in parallel with the saw blade, and is arranged in the vicinity of said receiving metal fittings.

The fifth feature of the present invention resides in mechanisms for guiding cut bands which constitute part of the apparatus for removing cut bands. Said mechanisms for guiding cut bands are arranged in rows corresponding to the number of coil bands in parallel with the direction of coil band, and the forward end thereof is extended at the lower part of a device for sawing coil bands across said device; said mechanism comprises an endless first conveyor belt incorporating a magnet for holding a band at the inner part of said extension. By this mechanism one of cut ends of the coil band is held by the incorporated magnet and placed on said first conveyor belt, then with the motion of said first conveyor belt, while subsequent portions are held, by the guidance of attached guides on both sides, the hand is automatically moved in parallel with the belt and can be shifted to the subsequent process step.

The sixth feature of the present invention resides in a mechanism for coiling cut band which constitutes part of the apparatus for removing cut bands, said coiling mechanism comprising an endless second conveyor belt wherein a part of the lower portion thereof is overlapped on the upper portion of the surface of said first conveyor belt, both portions advancing at the same speed while snapping cut coil band, and which is guided while being overlapped by a pulley on the adjoining end of said first conveyor belt, and a circular band-receiving base which receives cut bands extruded while being shaped into a small circle under pressure of the second conveyor belt and is supported in a freely oscillating manner. By this mechanism a cut band moved along on the first conveyor belt is shaped into a small circle at the forward end of the first conveyor belt by a joint operation with the second conveyor belt, forced into a band- receiving base to form a small coil shape and then naturally falls in the oscillating position by means of oil pressure cylinders or the like of the band-receiving base and piled up at a predetermined position.

The seventh feature of the present invention resides in the use of oil pressure cylinders and limit switches at said respective portions, whereby a rapid and precise action can be carried out by a simple mechanism.

Further objects and advantages of the present invention will be apparent from the following description taken in connection with the appended drawings, in which.

Figure 1:
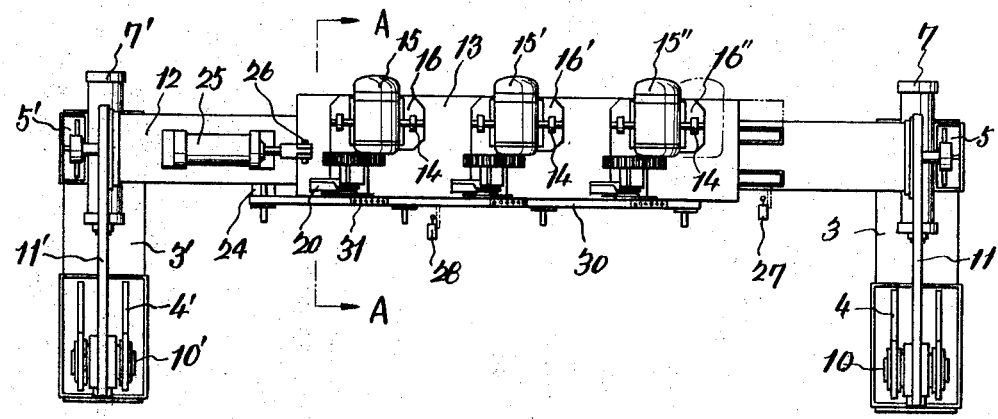
FIG. 1 is a plan view showing a band cutter of the present invention.
Figure 2:
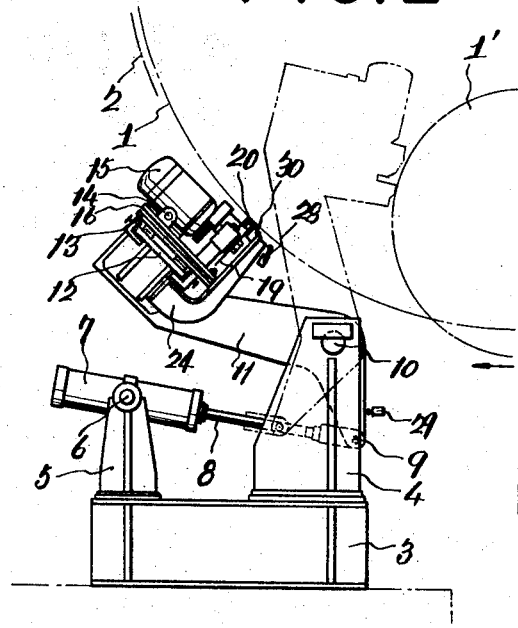
FIG. 2 is a sectional view taken on the line A-A of FIG. 1.
Figure 3:
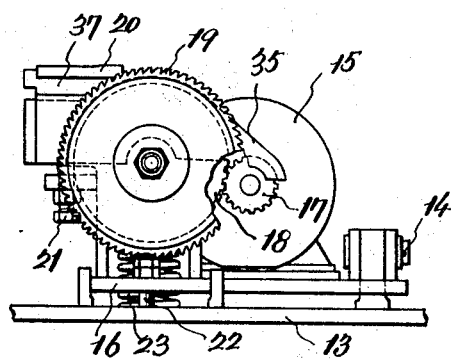
FIG. 3 is an enlarged side view, partly broken away, showing the principal part of the band cutter.

FIGS. 1 to 5, respectively, of the drawings show an automatic coil band cutter. Coils 1 and 1' (coil 1 indicates a case where the diameter of coil is maximum and coil 1' indicates a case where the diameter of coil is minimum) shown in FIG. 2 are transported by being mounted on a chain conveyor or the like (not shown). Then, by the conveyor stop signal motors 15, 15' and 15", respectively, for the saw cutter shown in FIG. 1 are put in motion by the number of bundle of coil band 2, and simultaneously therewith cylinders 7 and 7' arranged to the left and right sides of the motors are operated. As a result, rods 8 and 8' of oil pressure cylinders 7 and 7' supported by pins 6 and 6' on the receiving bases 5 and 5' mounted on frames 3 and 3' provided to the left and right sides of the motors advance and retreat to operate levers 11 and 11' supported by pins 10 and 10' through pins 9 and 9', respectively. A beam 12 is mounted on levers 11 and 11'. On the beam a base metal plate 13 makes reciprocating motions by the oil pressure cylinder 25 through a pin 26.

On the base metal plate 13 saw cutter bases 16, 16' and 16" are respectively supported by pins 14 projected thereon. By pushing a saw base 36 shown in FIG. 4 by means of a spring 23 shown in FIG. 3 the saw cutter is supported in a freely oscillating manner under constant compression of the spring 23. Furthermore, a bolt 22 projects on the base metal plate 13 together with a nut to limit the upward motion of the saw cutter bases 16, 16' and 16" against the force of the spring 23 to adjust the height of a saw 19.

Also, a bolt 21 is slidably screwed to the saw base 36 and the top end of which is rotatably held to metal fittings 37, so the bolt 21 adjusts receiving metal fittings 20 so that it corresponds to the outer diameter of the saw 19 through metal fittings 37. The receiving metal fittings 20 are urged against the surfaces of coils 1 and 1' by the retreat actions of cylinders 7 and 7', and stopped by the action of a limit switch 28.

Figure 4:
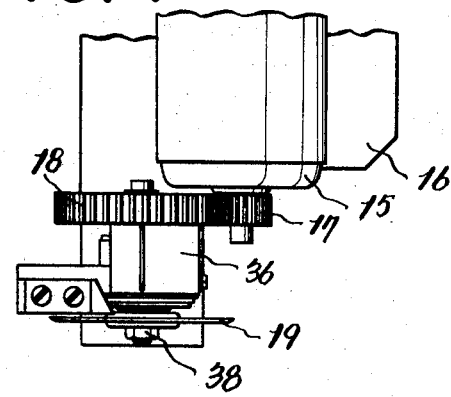
FIG. 4 is an enlarged plan view, partly broken away, showing the principal part of the band cutter.

The rotation of the motors 15 shown in FIG. 4 is retarded by gears 17 and 18 to rotate the saw 19.

Figure 5:
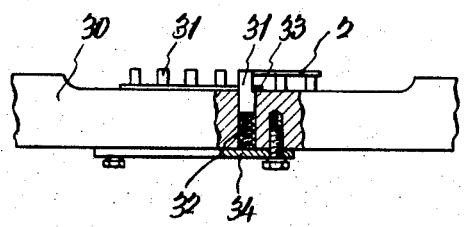
FIG. 5 is an enlarged side view, partly broken away, showing a band transference preventing device at the time of cutting.

As shown in detail in FIG. 5, there are many holes in the stopper 30 arranged in a row parallel to the cutting direction of the saw 19 and in each hole there is a pin 31 and a spring 32 slidably inserted in contact with the pin 31. The bottom of the hole is closed by metal fittings 34 fixed to the bottom of the stopper 30 and metal fittings 33 fixed to the top of the stopper 30 limits the upward motion of the pin 31 by engaging the shoulder part of the pin 31 with the hole of the metal fittings 33 so that the forward end of the pin 31 projects through the hole. As the result, when the band 2 is cut with the saw 19, the pins 31 hold the band 2 by means of the force of the spring 32 to prevent it from sliding.

The cylinder 25 causes the saw 19 to advance to cut the band 2. By detection of a limit switch 27 cylinders 7 and 7' advance and the saw blade 19 is spaced from the surface of the coil. The cylinder 25 retreats by a limit switch 29 and is restored to the original position.

Figure 6:
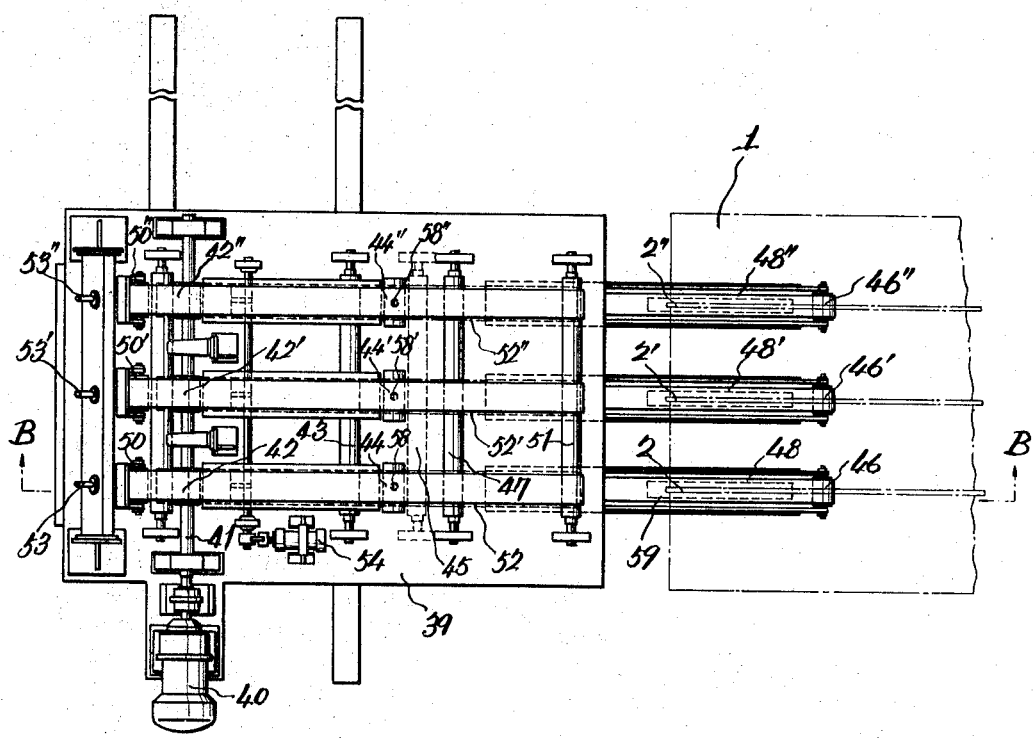
FIG. 6 is a plan view showing a band-removing device.
Figure 7:
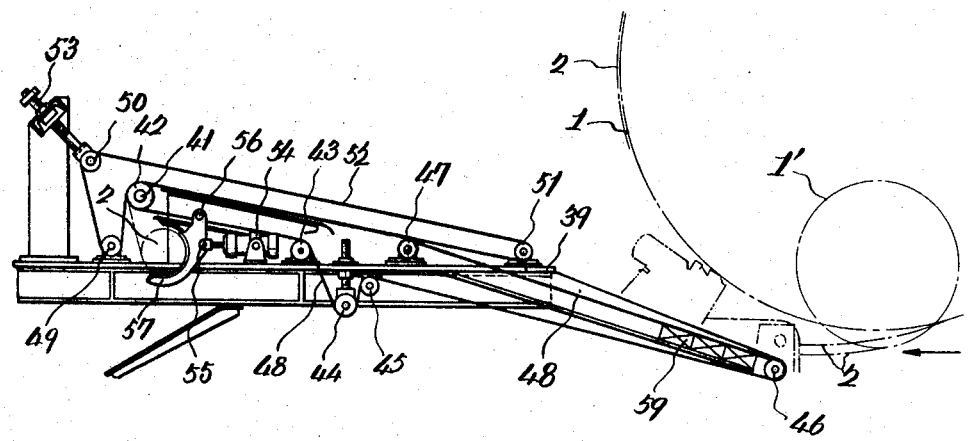
FIG. 7 is a sectional view taken on the line B-B of FIG. 6.

FIGS. 6 and 7 show a coil band removing apparatus. The cut band 2 is removed by means of an apparatus shown in FIGS. 6 and 7. In both FIGS. a gear motor 40 on the frame 39 is directly connected to a shaft 41 and pulleys 42, 42' and 42" are keyed to the shaft 41 and rotated. Belts 48, 48' and 48" pass through rollers and pulleys 43, 44, 44', 44"', 45, 46, 46', 46" and 47 and are suspended on pulleys 42, 42' and 42". Bolts 58, 58' and 58" are tension means for belts 52, 52' and 52".

Magnets 59 are respectively provided below belts 48, 48' and 48", and the forward ends of cut bands 2 are held and sent out on belts 48, 48' and 48". The cut band 2 is snapped between belts 48 and 52 and wound up into a small bundle. Band-receiving bases 57, 57' and 57" are supported by a shaft 56 and pin 55 of cylinder 54. By the signal of limit switch 29 shown in FIG. 2 a geared motor 40 is put in motion, and simultaneously a cylinder 54 advances. By a timer switch (not shown) the geared motor 40 stops to rotate and a cylinder 54 operates rearwardly and the band 2 is dropped and treated.

Further, operational relations between various limit switches, cylinder motors and other parts in the aforementioned embodiment will be summarized as shown in the following table:

In the foregoing, the embodiment of this invention has been explained. By installing the present apparatus it expedites cutting and removing, unlike manual operation, without danger, and hence it is very efficient and abundant effects can be expected in sparing personnel expenses and promoting productivity.

Although best one embodiment of the invention has been shown and described in detail, it will be understood that other embodiments are possible and that various changes may be made in the design and arrangement of the parts without departing from the spirit of the present invention.

I claim:

1. An automatic coil band cutter comprising:
   a. saw cutters in the number corresponding to the number of coil bands;
   b. common base metal plates (13) arranged for reciprocating motion on these saw cutters;
   c. saw cutter bases (16, 16') supported on said base metal plates in a freely oscillating manner including pins and springs, said pins projecting in parallel with the direction of reciprocating motion of said base metal plates under compression of said springs:
   d. saw blades (19) disposed in parallel with each other held to said saw cutter bases;
   e. oil pressure cylinders (7, 7'), lever means (11, 11') connected to said cylinders and beams (12) connected to said lever means so constructed that said metal plates (13) are disposed thereon in a freely slidable manner and can carry out said reciprocating motions in the direction parallel with said saw blades by the action of said oil pressure cylinders (7, 7'); and
   f. pins (10, 10') provided in parallel with the direction of reciprocating motion of said metal plates for supporting said beams so that they can oscillate by the action of said oil pressure cylinders (7, 7').

2. An automatic coil band cutter as claimed in claim 1, including a band transverse motion preventing device consisting of stoppers having a suitable number of slidable pins (31) disposed in parallel with saw blades under compression of springs.

3. An automatic coil band cutter according to claim 1, said lever means (11, 11') being a bellcrank lever, a limit switch (27) defining the advance of said oil pressure cylinders (7, 7'), said bellcrank lever being disposed for moving said saw cutter bases and saw blades to a proper position over the surface of said coil.

TABLE

| | Operation of limit switch | Operation of cylinder and motor | Operation of respective parts |
|---|---|---|---|
| Coil band cutter: | | | |
| 1 | Stop of conveyor driving | Fig. 1, 15, 15', 15", starting | Saw blade begins to rotate. |
| | Operation (not shown) | Fig. 2, 7 and 7', retreating | Saw blade is pressed against the surface of coil. |
| 2 | Operated by 28 in Fig. 2 | Fig. 2, 7 and 7' stop | Saw blade stops on the surface of coil. |
| | do | Fig. 1, 25 advance | Cutting band. |
| 3 | Operated by 27 in Fig. 1 | Fig. 2, 7 and 7' advance | Saw blade is separated from the surface of coil. |
| 4 | Operated by 29 in Fig. 2 | Fig. 1, 25 retreats | Saw base metal plate 13 is restored to the original position. |
| | do | Fig. 1, 15, 15' and 15" stop | Rotation of saw blade stops. |
| Coil band removing apparatus: | | | |
| 1 | do | Fig. 6, 40, starting | Belts 48, 48', 48", 52, 52' and 52" rotate. |
| | do | Fig. 7, 54 advance | Band 2 is supported. |
| 2 | Timer switch (not shown) | Fig. 6, 40 stops | Rotation of belts 48, 48', 48", 52, 52' and 52" stop. |
| | do | Fig. 7, 54 retreats | Band 2 falls down. |